US011091234B1

United States Patent
Rose et al.

(10) Patent No.: US 11,091,234 B1
(45) Date of Patent: Aug. 17, 2021

(54) SYSTEMS AND METHODS FOR CONFIGURING PONTOONS AND STRAKES FOR MARINE VESSELS HAVING A FORWARD CENTER OF GRAVITY

(71) Applicant: Brunswick Corporation, Mettawa, IL (US)

(72) Inventors: Gary W. Rose, Roanoke, IN (US); Surinder P. Singh, Fort Wayne, IN (US); Neal E. Jurss, Fort Wayne, IN (US)

(73) Assignee: Brunswick Corporation, Mettawa, IL (US)

( * ) Notice: Subject to any disclaimer, the term of this patent is extended or adjusted under 35 U.S.C. 154(b) by 61 days.

(21) Appl. No.: 16/675,989

(22) Filed: Nov. 6, 2019

(51) Int. Cl.
  *B63B 35/38* (2006.01)
  *B63B 35/34* (2006.01)
  *B63B 1/04* (2006.01)
  *B63B 1/12* (2006.01)
  *B63B 1/18* (2006.01)
  *B63B 1/20* (2006.01)
  *B63B 1/32* (2006.01)

(52) U.S. Cl.
  CPC ............... *B63B 35/38* (2013.01); *B63B 1/04* (2013.01); *B63B 1/12* (2013.01); *B63B 1/125* (2013.01); *B63B 1/18* (2013.01); *B63B 1/20* (2013.01); *B63B 1/32* (2013.01); *B63B 35/34* (2013.01)

(58) Field of Classification Search
  CPC .... B63B 1/00; B63B 1/04; B63B 1/10; B63B 1/12; B63B 1/16; B63B 1/18; B63B 1/20; B63B 1/125; B63B 1/32; B63B 35/00; B63B 35/34; B63B 35/38; B63B 35/58
  USPC .............. 114/61.22, 61.24, 61.32, 292
  See application file for complete search history.

(56) References Cited

U.S. PATENT DOCUMENTS

| | | | |
|---|---|---|---|
| 5,619,944 A * | 4/1997 | Baker | B63B 1/20 114/292 |
| 6,234,098 B1 | 5/2001 | Biedenweg et al. | |
| 6,302,042 B1 | 10/2001 | Biedenweg et al. | |
| 9,937,983 B1 | 4/2018 | Duke et al. | |
| 2009/0031939 A1 * | 2/2009 | Fishburn | B63B 35/38 114/292 |

* cited by examiner

*Primary Examiner* — Lars A Olson
(74) *Attorney, Agent, or Firm* — Andrus Intellectual Property Law, LLP

(57) ABSTRACT

A floatation system for a marine vessel having a deck. The floatation system includes three pontoons each having a cylindrical portion extending between forward and aft ends. The three pontoons include a starboard pontoon, a port pontoon, and a center pontoon positioned therebetween. Support members are coupled to the deck and to the three pontoons such that the three pontoons are interposed. Outer strakes each having a tip and an elongated portion, the elongated portions each extending along an outer length between forward and aft ends, are each coupled to one of the starboard pontoon and the port pontoon. Inner strakes each having a tip and an elongated portion, the elongated portions each extending along an inner length between forward and aft ends, are each coupled to the center pontoon. The aft ends of the outer strakes are aft of the aft ends of the inner strakes.

20 Claims, 4 Drawing Sheets

SYSTEMS AND METHODS FOR CONFIGURING PONTOONS AND STRAKES FOR MARINE VESSELS HAVING A FORWARD CENTER OF GRAVITY

FIELD

The present disclosure generally relates to systems and methods for configuring pontoons and strakes for marine vessels having a forward center of gravity.

BACKGROUND

The following U.S. Patents and Patent Applications provide background information and are incorporated by reference in entirety.

U.S. Pat. No. 9,937,983 discloses a pontoon boat including at least two pontoon tubes, a platform supported on the at least two pontoon tubes, and an occupancy compartment capable of containing at least one occupant, the occupancy compartment having a length, a width, an upper portion extending vertically above the platform that includes a ceiling, and a lower portion extending vertically below the platform and into one of the at least two pontoon tubes, the lower portion including a floor surface for supporting the occupant. An entrance to the occupancy compartment is provided in the upper portion that permits the occupant to enter and exit the occupancy compartment.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a floatation system for a marine vessel having a deck. The floatation system includes three pontoons each having a nose cone and a cylindrical portion. The cylindrical portions each have a length extending between forward and aft ends. The three pontoons include a starboard pontoon, a port pontoon, and a center pontoon positioned therebetween. Support members are coupled to the three pontoons such that the three pontoons are interposed. The support members are configured to be coupled to the deck. The floatation system includes outer strakes each having a tip and an elongated portion, the elongated portions each extending along an outer length between forward and aft ends, and each being coupled to one of the starboard pontoon and the port pontoon. The floatation system includes inner strakes each having a tip and an elongated portion, the elongated portions each extending along an inner length between forward and aft ends, and each being coupled to the center pontoon. The aft ends of the outer strakes are aft of the aft ends of the inner strakes.

Another embodiment generally relates to a floatation system for a marine vessel having a deck. The floatation system includes three pontoons each having a nose cone and a cylindrical portion, the cylindrical portions each having a length extending between forward and aft ends. The three pontoons include a starboard pontoon, a port pontoon, and a center pontoon positioned therebetween. Support members are coupled to the three pontoons such that the three pontoons are interposed. The support members are configured to be coupled to the deck. Outer strakes each having a tip and an elongated portion, the elongated portions each extending along an outer length between forward and aft ends, are each coupled to one of the starboard pontoon and the port pontoon. Inner strakes each having a tip and an elongated portion, the elongated portions each extending along an inner length between forward and aft ends, are each coupled to the center pontoon. The aft ends of the outer strakes are at least one foot aft of the aft ends of the inner strakes, and the aft ends of the inner strakes are at least nine feet from the aft end of the center pontoon.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Pontoon boats, or marine vessels incorporating pontoons within their flotation system, are generally known vehicles for enjoying time on the water. The present inventors have recently developed new designs in which an upper structure positioned above the pontoons has been moved towards the forward end of the vessel relative to configurations presently known in the art. For example, these upper structures may include a helm, furniture, fences, and/or various accessories impacting the center of gravity for the vessel overall. However, through experimentation and development, the present inventors have identified that moving the center of gravity forward can create undesired consequences under certain conditions. For example, the present inventors have identified that, when operated at a high speed, vessels having a forward center of gravity may experience handling issues causing an outside pontoon tube to "pop up" during a high speed turn. This creates an uneasy feeling for the pilot of the boat and a general lack of confidence in its handling capabilities. Through further experimentation and development, the present inventors have identified the presently disclosed alternate running surfaces and configuration to eliminate this popping out of the outside tube, and further that improves the operating performance overall, while also reducing material cost.

Figure 1:
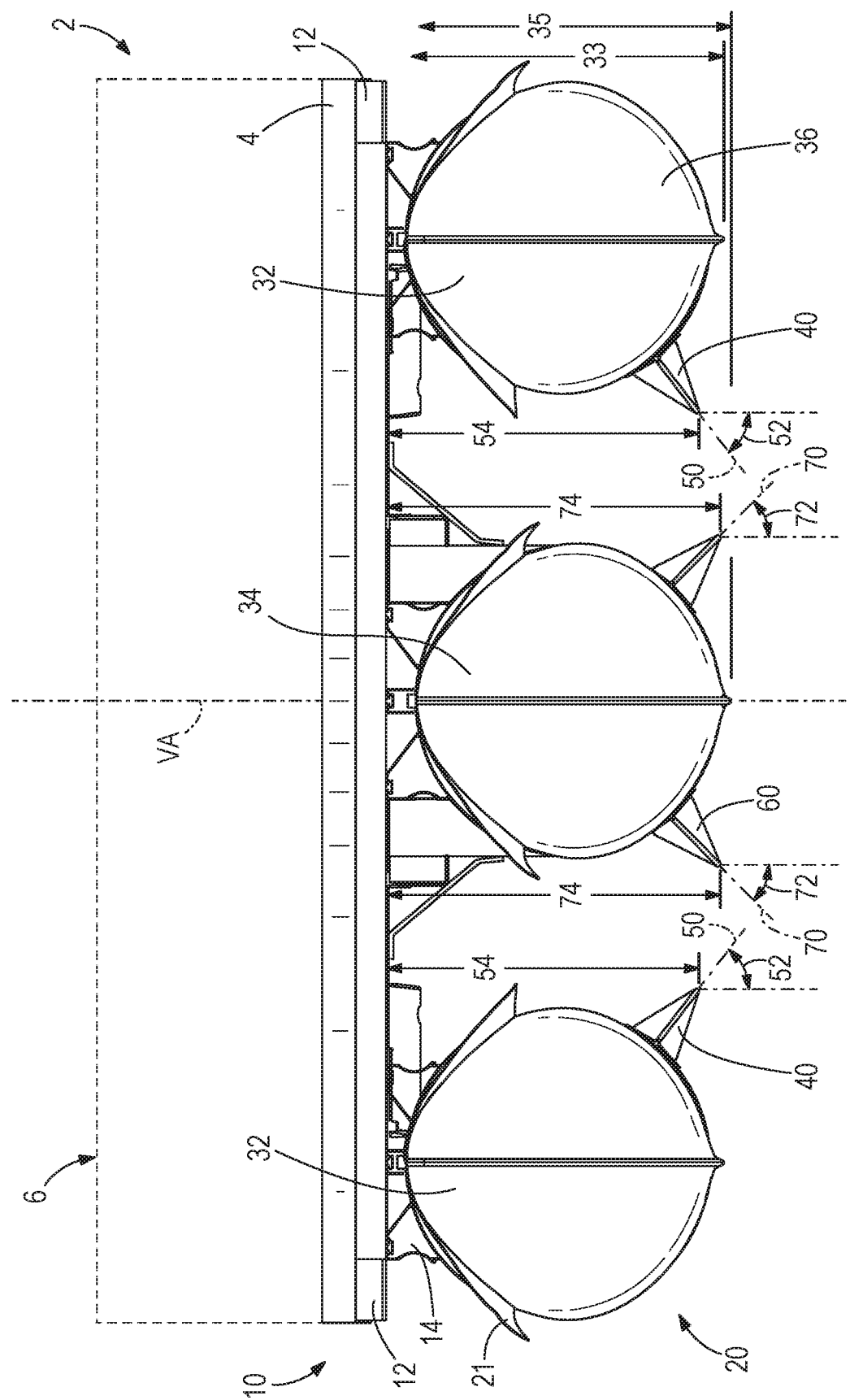
FIG. 1 is a front view of a flotation system for a marine vessel according of the present disclosure.

FIG. 1 depicts a front view of an exemplary floatation system 10 for a pontoon boat 2 according to the present disclosure. The pontoon boat 2 includes an upper structure 6 mounted to a deck 4 that is supported on the water by a flotation system 10. In the example shown in FIGS. 1-3, the flotation system 10 includes three pontoons 20 each having a nose cone 22 and a cylindrical portion 24 extending along a length 29 between a forward end 26 and an aft end 28. The three pontoons 20 may further be defined as a port pontoon 32, center pontoon 34 and starboard pontoon 36. Each of the three pontoons 20 further includes deflectors 21 as is known in the art.

The flotation system 10 further includes support members 12 coupled to each of the three pontoons 20, which hold the pontoons 20 in an interposed manner. The support members 12 may be coupled directly to the pontoons 20, or as presently shown may be coupled via mounting hardware 14. The support members 12 are further configured to be coupled to the deck 4 for coupling the flotation system 10 thereto. As will become apparent, the lengths 29 of the cylindrical portions 24 of the pontoons 20 need not be the same. Likewise, the center depth 35 (FIG. 1) from the bottom of the center pontoon 34 may not be the same as an outer depth 33 corresponding to the port pontoon 32 and starboard pontoon 36.

Figure 2:
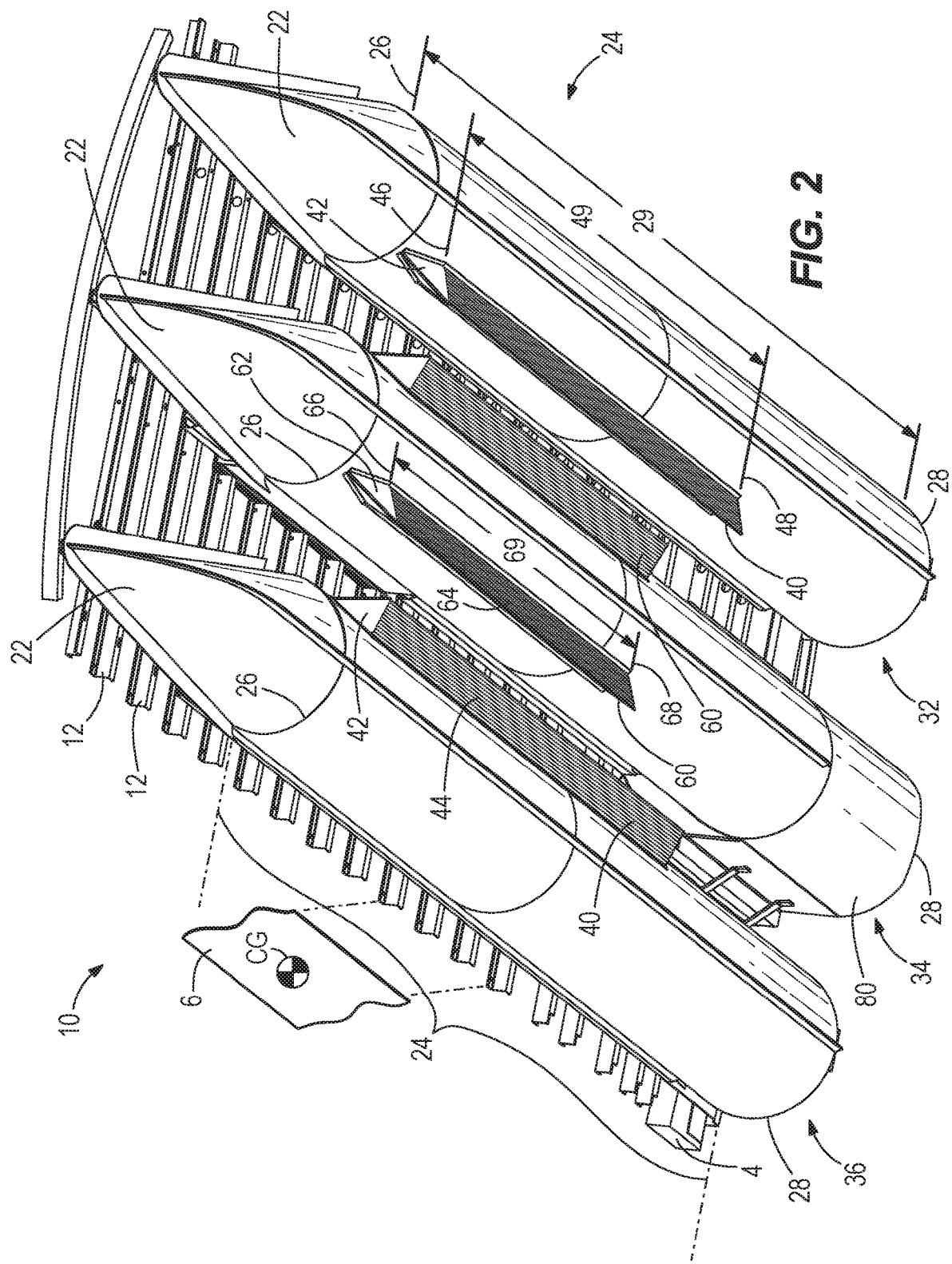
FIG. 2 is a bottom isometric view of the flotation system from FIG. 1.
Figure 3:
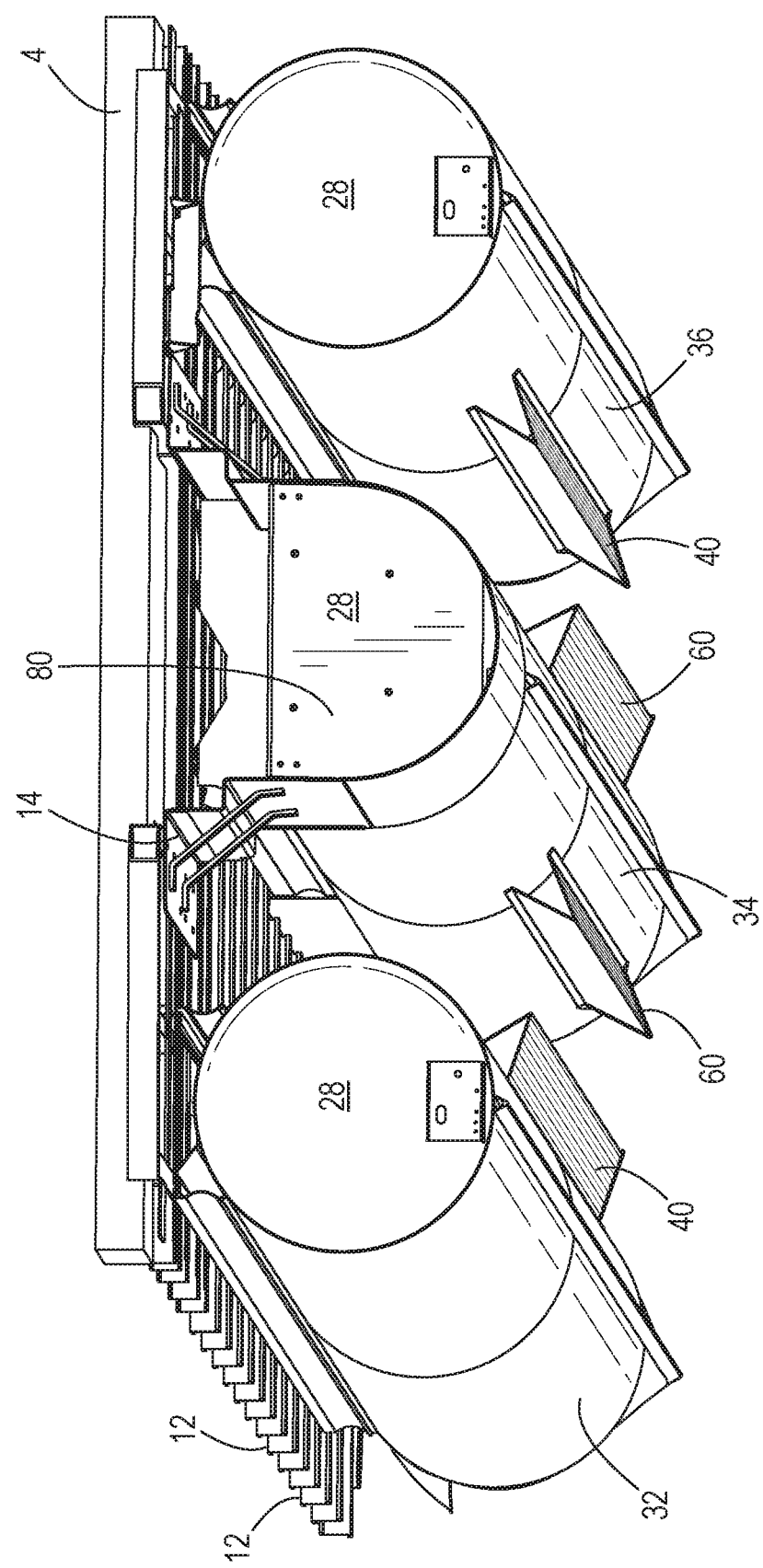
FIG. 3 is a rear isometric view of the flotation system of FIG. 1.

FIGS. 1-3 further depict the floatation system 10 having outer strakes 40 coupled to one of the port pontoon 32 or the starboard pontoon 36. Each outer strake has a tip 42 and an elongated portion 44 that extends an outer length 49 between a forward end 46 and an aft end 48. The outer strakes 40 each define a center line 50 and are at an outer strake angle 52 relative to a vertical access VA (FIG. 1). As such, each outer strake therefore extends downwardly from the support member 12 an outer strake depth 54.

In a similar manner, the flotation system 10 further includes inner strakes 60 each coupled to the center pontoon 34 in a manner similar to that previously described for the outer strakes 40. The inner strakes 60 each have a tip 62 and an elongated portion 64 that extends an inner length 69 between a forward end 66 and an aft end 68. Each of the inner strakes 60 defines a center line 70 that extends away from the center pontoon 34 at an inner strake angle 72 relative to the vertical axis VA. As such, each of the inner strakes 60 extends downwardly from the underside of the support member 12 and inner strake depth 74.

In the embodiment shown in FIG. 1, the outer strake angles 52 of the outer strakes 40 are shown to be the same as the inner strake angles 72 of the inner strakes 60. However, it should be recognized that other configurations are also anticipated by the present disclosure in which these angles are not the same. In contrast, the center depth 35 from the center pontoon 34 from the support member 12 is shown to be greater than the outer depths 33 corresponding to the port pontoon 32 and the starboard pontoon 36. Likewise, the outer strake depth 54 corresponding to the outer strakes 40 are shown greater than the inner strake depth 74 of the inner strakes 60. Alternate embodiments for these features are also anticipated by the present disclosure.

As shown in FIG. 2, the center pontoon 34 is further configured to include an fuel reservoir 80 for containing fuel for a propulsion device to propel the pontoon boat 2 in a manner known in the art. As will be discussed later, the relative volume of the fuel reservoir 80 may vary, depending in part upon the overall size of the floatation system 10, such as the lengths 29 of the pontoons 20.

Figure 4:
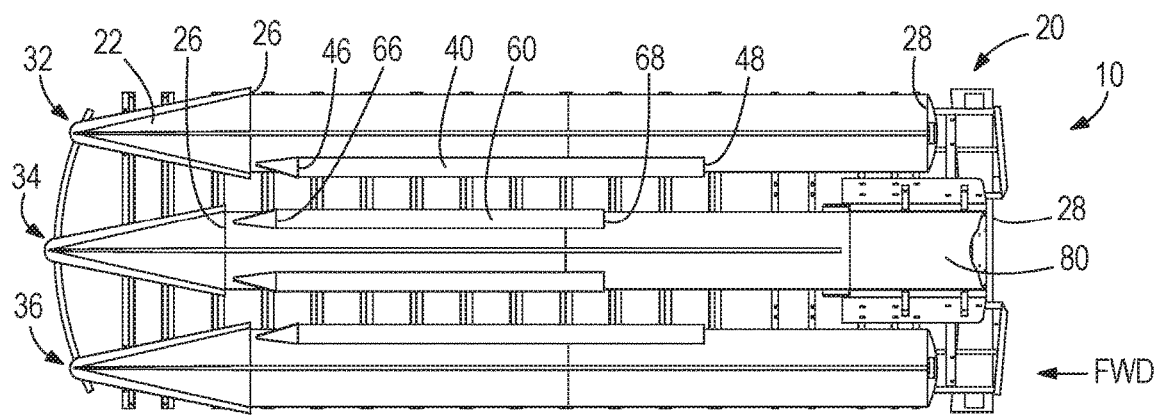
FIGS. 4-6 depict bottom views of various configurations of flotation systems similar to that of FIG. 1 according to the present disclosure.
Figure 5:
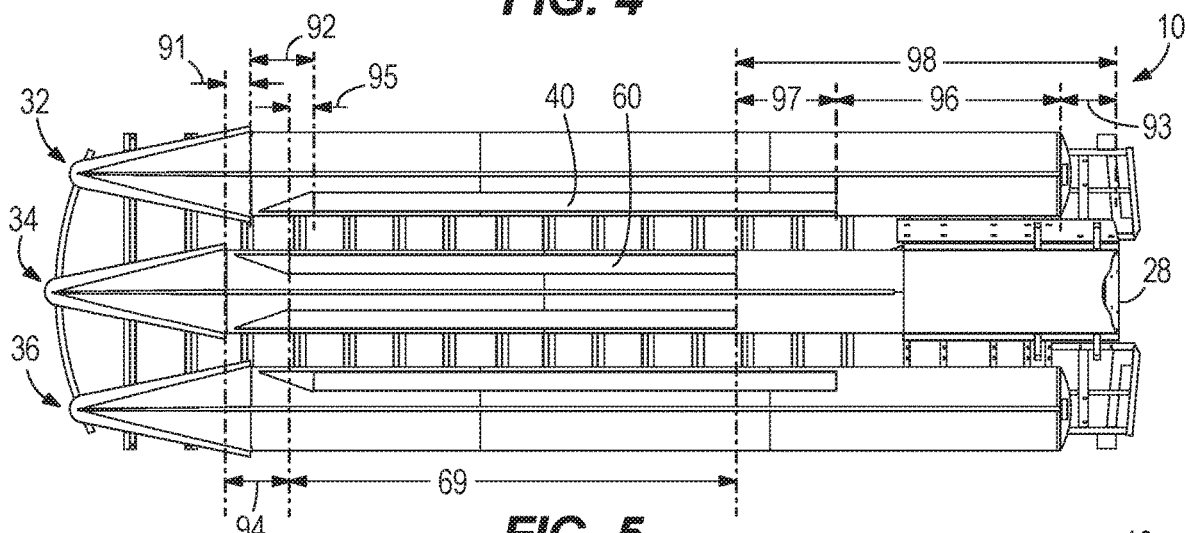
Figure 6:
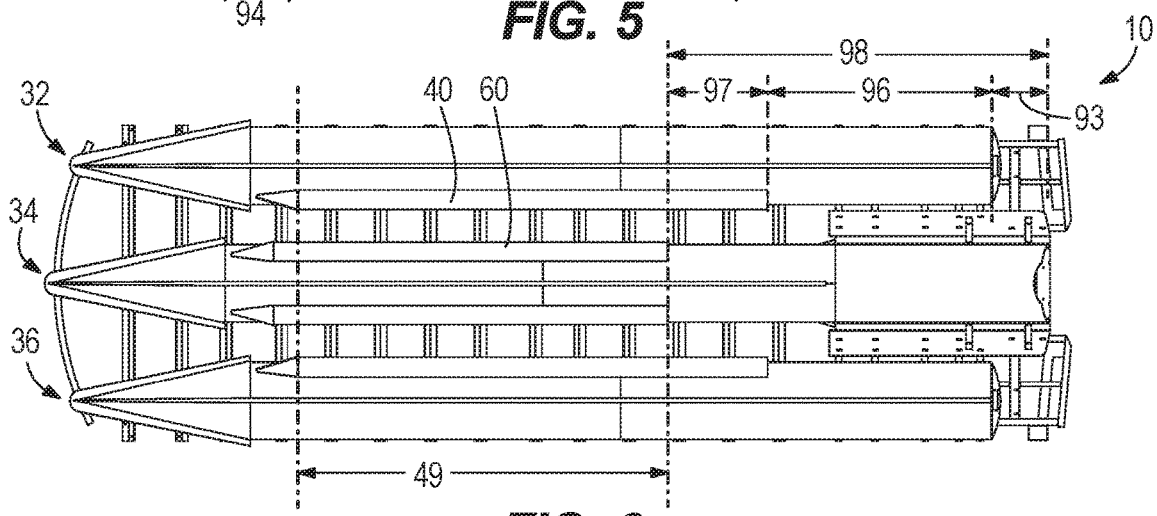

FIGS. 4-6 depict various embodiments of flotation systems 10 according to present disclosure, and particularly those in which high-speed turning and the avoidance of the pop-out phenomenon previously discussed are greatly improved over systems presently known in the art. Although the same general structures are present across these figures, each includes progressively longer pontoons 20, inner strakes 60, and outer strakes 40. For the sake of clarity, the same structures and measurement points should be interpreted as existing in FIGS. 4-6 without being numerically repeated in each instance. However, actual dimensions and distances may vary from figure to figure, as is shown.

Exemplary dimensions or measurement points between components and landmarks are provided for comparing the embodiments of FIGS. 4-6 relative to each other, as well as relative to systems presently known in the art. A forward pontoon delta 91 is defined as the distance between the forward end 26 of the center pontoon 34 relative to the port pontoon 32 and starboard pontoon 36. Likewise, an aft pontoon delta 93 is defined as the distance between the aft end 28 of the center pontoon 24 and the aft ends 28 of the port pontoon 32 and starboard pontoon 36. Similar measurements are also defined for the outer strakes 40 and inner strakes 60, including a forward strake delta 95 defined as the distance between the forward end 46 of the outer strakes 40 and the forward end 66 of the inner strakes 60. Likewise, and aft strake delta 97 is defined as the difference between the aft end 48 of the outer strakes 40 and the aft end 68 of inner strake 60.

Similar measurements are also defined between the strakes and the pontoons. A forward outer strake offset 92 is defined as the distance between the forward end 26 of the port pontoon 32 and starboard pontoon 36 and the forward end 46 of the outer strakes 40. A forward inner strake offset 94 is defined as the distance between the forward end 26 of the center pontoon 34 and the forward end 66 of the inner strakes 60. In a similar manner, an aft outer strake offset 96 is defined as the distance between the aft ends 28 of the port pontoon 32 and starboard pontoon 36 and the aft end 48 of the outer strakes 40, where as an aft inner strake offset 98 is define as the distance between the aft end 28 of the center pontoon 34 and the aft end 68 of the inner strakes 60.

As shown in FIGS. 4-6, in certain embodiments the forward ends 46 of the outer strakes 40 are aft of the forward ends 66 of the inner strakes 60. In further embodiments, the forward ends 46 of the outer strakes 40 and the forward ends 66 of the inner strakes 60 are aft of the forward ends 26 of all three pontoons 20, whereas the aft ends 48 of the outer strakes 40 and the aft ends 68 of the inner strakes 60 are forward of the aft ends 28 of all three pontoons 20. In further embodiments, the forward ends 46 of the outer strakes 40 are aft of the forward ends 66 of the inner strakes 60, and the aft end 28 of the center pontoon 34 is after the aft ends 28 of the starboard pontoon 36 and the port pontoon 32.

Through research and development, the present inventors have identified that the outer lengths 49 of the outer strakes 40 relative to the inner lengths 69 of the inner strakes 60 impact the performance and stability of the floatation system 10 in operation. This may be particularly pronounced during high-speed turns. Accordingly, the presently disclosed systems improve upon this performance by configuring the pontoons and strakes in a manner not previously known in the art. In certain embodiments, the outer length 49 of the outer strakes 40 is between one and three feet longer than the inner length 69 of the inner strakes 60, and in certain embodiments specifically approximately two feet longer. Additionally, the present inventors have identified particular performance benefits when the floatation system 10 is configured such that the aft ends 48 of the outer strakes 40 are between five and seven feet forward of the aft ends 28 of the starboard pontoon 36 and port pontoon 32, and the aft ends 68 of the inner strakes 60 are between nine and twelve feet forward of the aft end 28 of the center pontoon 34. In further embodiments, the inventors have identified particular advantages when the aft ends 48 of the outer strakes 40 are approximately six feet forward of the aft ends 28 of the port pontoon 32 and starboard pontoon 36, and the aft ends 68 of the inner strakes 60 are approximately ten feet forward of the aft end 28 of the center pontoon 34.

These exemplary configurations can be shown in comparison of the flotation systems 10 of FIGS. 4-6. In particular, the figures depict a relatively consistent aft strake delta 97 between the aft ends 48 of outer strakes 40 and the aft ends 68 of the inner strakes 60 regardless of the lengths 29 of the pontoons 20. The present inventors have identified that it is particularly this configuration, whereby the aft strake delta 97 is between one and three feet, and in certain embodiments is approximately two feet, provides particular performance enhancements during high-speed turns for pontoons boats 2 having a forward center of gravity relative to pontoon boats 2 presently known in the art. The strake length difference allows for smoother water flow and prevents water flow from the center pontoon 34 from interfering with the outer strakes 40 when the pontoon boat 2 is in a turn. Through experimentation and development, the present inventors have further identified that the configurations disclosed herein not only improve the ride and handling of the pontoon boats 2, but also increased top speed and reduced material costs by permitting shorter strakes. In particular, the present inventors were surprised to discover that the preferred configurations described above performed very well irrespective of the lengths 29 of the pontoons 20, allowing for standardization of strakes across multiple models of pontoon boats 2. In certain examples, a floatation system 10 according to the present disclosure results in a reduction of up to 32 feet of material for the outer strakes 40 and inner strakes 60 as compared to like-sized pontoon boats having three pontoons presently known in the art. In addition to a reduction in the cost of extruded aluminum, this also reduces the number of welds required per floatation system 10, providing further savings in time and labor expense.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A floatation system for a marine vessel having a deck, the floatation system comprising:
    three pontoons each having a nose cone and a cylindrical portion, the cylindrical portions each having a length extending between forward and aft ends, wherein the three pontoons include a starboard pontoon, a port pontoon, and a center pontoon positioned therebetween;
    support members coupled to the three pontoons such that the three pontoons are interposed, wherein the support members are configured to be coupled to the deck;
    outer strakes each having a tip and an elongated portion, the elongated portions each extending along an outer length between forward and aft ends, and each being coupled to one of the starboard pontoon and the port pontoon; and
    inner strakes each having a tip and an elongated portion, the elongated portions each extending along an inner length between forward and aft ends, and each being coupled to the center pontoon;
    wherein the aft ends of the outer strakes are aft of the aft ends of the inner strakes, and wherein the aft ends of the outer strakes are forward of the aft ends of the starboard pontoon and the port pontoon, respectively.

2. The floatation system according to claim 1, wherein the forward ends of the outer strakes are aft of the forward ends of the inner strakes.

3. The floatation system according to claim 1, wherein the forward ends of the outer strakes and of the inner strakes are aft of the forward ends of the three pontoons, and wherein the aft ends of the inner strakes are forward of the aft ends of the three pontoons.

4. The floatation system according to claim 3, wherein the forward ends of the outer strakes are aft of the forward ends of the inner strakes, and wherein the aft end of the center pontoon is aft of the aft ends of the starboard and port pontoons.

5. The floatation system according to claim 1, wherein the lengths of the outer strakes are between one and three feet longer than the lengths of the inner strakes.

6. The floatation system according to claim 5, wherein the aft ends of the outer strakes are between five and seven feet forward of the aft ends of the starboard and port pontoons, and wherein the aft ends of the inner strakes are between nine and twelve feet forward of the aft end of the center pontoon.

7. The floatation system according to claim 6, wherein the outer strakes each have a centerline that extends away from the starboard and port pontoons at an outer strake angle relative to a vertical axis, wherein the inner strakes each have a centerline that extends away from the center pontoon at an inner strake angle relative to a vertical axis, and wherein the outer strake angles are the same as the inner strake angle.

8. The floatation system according to claim 6, wherein the inner strakes and the outer strakes extend downwardly away from the deck an inner strake depth and an outer strake depth, respectively, and wherein the inner strake depth is greater than the outer strake depth.

9. The floatation system according to claim 8, wherein the center pontoon extends downwardly away from the deck a center depth and the starboard and port pontoons each extend downwardly away from the deck an outer depth, and wherein the center depth is greater than the outer depth.

10. The floatation system according to claim 9, wherein the aft end of the center pontoon is aft of the aft ends of the starboard and port pontoons.

11. The floatation system according to claim 10, wherein the forward end of the center pontoon is forward of the forward ends of the starboard and port pontoons.

12. The floatation system according to claim 10, wherein the forward ends of the outer strakes are aft of the forward ends of the inner strakes.

13. The floatation system according to claim 5, wherein the lengths of the outer strakes are approximately two feet longer than the lengths of the inner strakes.

14. The floatation system according to claim 13, wherein the aft ends of the outer strakes are approximately six feet forward of the aft ends of the starboard and port pontoons, and wherein the aft ends of the inner strakes are approximately 10 feet forward of the aft end of the center pontoon.

15. The floatation system according to claim 14, wherein the inner strakes and the outer strakes extend downwardly away from the deck an inner strake depth and an outer strake depth, respectively, and wherein the inner strake depth is greater than the outer strake depth.

16. The floatation system according to claim 15, wherein the center pontoon extends downwardly away from the deck a center depth and the starboard and port pontoons each extend downwardly away from the deck an outer depth, and wherein the center depth is greater than the outer depth.

17. The floatation system according to claim 16, wherein the aft end of the center pontoon is aft of the aft ends of the starboard and port pontoons, and wherein the forward end of the center pontoon is forward of the forward ends of the starboard and port pontoons.

18. The floatation system according to claim 17, wherein the forward ends of the outer strakes are aft of the forward ends of the inner strakes, and wherein the aft ends of the outer strakes are aft of the aft ends of the inner strakes.

19. The floatation system according to claim 1, wherein at least one of the three pontoons defines a fuel reservoir therein for storing liquid fuel.

20. A floatation system for a marine vessel having a deck, the floatation system comprising:

three pontoons each having a nose cone and a cylindrical portion, the cylindrical portions each having a length extending between forward and aft ends, wherein the three pontoons include a starboard pontoon, a port pontoon, and a center pontoon positioned therebetween;

support members coupled to the three pontoons such that the three pontoons are interposed, wherein the support members are configured to be coupled to the deck;

outer strakes each having a tip and an elongated portion, the elongated portions each extending along an outer length between forward and aft ends, and each being coupled to one of the starboard pontoon and the port pontoon; and inner strakes each having a tip and an elongated portion, the elongated portions each extending along an inner length between forward and aft ends, and each being coupled to the center pontoon;

wherein the aft ends of the outer strakes are at least one foot aft of the aft ends of the inner strakes, and wherein the aft ends of the inner strakes are at least nine feet from the aft end of the center pontoon.

* * * * *